United States Patent
Veneziale, Jr.

[15] 3,663,341
[45] May 16, 1972

[54] THREE SHEET OVERLAY AND LAMINATES COMPRISING THE SAME

[72] Inventor: Lee E. Veneziale, Jr., Tyrone, Pa.

[73] Assignee: Westvaco Corporation, New York, N.Y.

[22] Filed: Jan. 25, 1971

[21] Appl. No.: 109,563

Related U.S. Application Data

[63] Continuation-in-part of Ser. No. 45,933, June 12, 1970, abandoned.

[52] U.S. Cl. ................................. 161/6, 161/82, 161/93, 161/194, 161/195, 161/200, 161/232, 161/233, 161/409, 161/413, 161/DIG. 4, 264/258
[51] Int. Cl. ................. B32b 17/12, B32b 21/08, B32b 27/36
[58] Field of Search .................. 52/613; 161/6, 82, 93, 194, 161/195, 200, 232, 233, 409, 423, DIG. 4, 5; 264/258

[56] References Cited

UNITED STATES PATENTS

| | | | |
|---|---|---|---|
| 3,484,334 | 12/1969 | Wakayoshi et al. | 161/251 |
| 3,413,188 | 11/1968 | Allen | 161/195 |
| 3,018,206 | 1/1962 | Hood et al. | 161/82 X |
| 2,816,851 | 12/1957 | Arledter | 161/409 X |
| 2,311,156 | 2/1943 | Casto | 161/409 X |
| 1,597,539 | 8/1926 | Novotny et al. | 161/409 X |

*Primary Examiner*—Robert F. Burnett
*Assistant Examiner*—Robert A. Dawson
*Attorney*—Ernest B. Lipscomb and Richard L. Schmalz

[57] ABSTRACT

A decorative and functional overlay comprising a sheet of glass fibers, a decorative sheet, and a shock-absorbing sheet, all sheets containing polyester resin. The sheets may be layed up with and fused directly to a rigidity-imparting base member or the sheets may be consolidated into a thin unitary panel not exceeding 0.030 inch in thickness which may be bonded or glued to a core material. A low pressure laminate with high impact resistance, suitable for horizontal as well as vertical surface applications, is produced by laminating the sheets in particular order to flakeboard having a density of at least about 46 pounds per cubic foot.

13 Claims, No Drawings

THREE SHEET OVERLAY AND LAMINATES COMPRISING THE SAME

CROSS REFERENCE TO RELATED APPLICATION

This application is a continuation-in-part of my co-pending application, Ser. No. 45,933 filed June 12, 1970, now abandoned.

BACKGROUND OF THE INVENTION

This invention relates to laminated articles and, more particularly, in one aspect it relates to a decorative overlay comprising three sheets of material, saturated with polymerizable unsaturated polyester resin, which can be heat and pressure consolidated to form a composite overlay panel. In another aspect of the invention, the three sheets are layed up with a rigidity-imparting base member and are heat and pressure consolidated to form a low pressure laminated article suitable for use as a general-purpose-type decorative laminate, i.e., one designed for both vertical and horizontal surface applications. As is known, low pressure laminates are generally defined as those laminates which can be cured by the application of heat at relatively low pressures, usually below about 250 p.s.i.

Conventional high pressure laminates, used in horizontal surface applications such as desk tops, counter tops, etc., are well known. They are conventionally made from a multiplicity of plies of paper (usually seven or more plies of kraft paper forming the core) saturated with phenolic resins, and include a print sheet, usually of alpha-cellulose paper impregnated with melamine-formaldehyde resin, and in some instances a protective overlay sheet, usually of alpha-cellulose treated with melamine-formaldehyde resin. The kraft sheets forming the core of the laminate provide rigidity when consolidated with the print and overlay sheets under heat and high pressure, usually about 300° F. and about 1,000 p.s.i. The laminate then is usually glued or bonded to a substrate, such as plywood, hardboard or particle board, to produce a product suitable for use in horizontal surface applications.

Laminated panels useful as vertical structures, but not possessing sufficient impact resistance and resistance to wear for use as horizontal surfaces, are also well known. Such laminates usually do not include a laminated core structure such as described above for high pressure laminates. These laminates have a lower density than those having a high density laminated core of kraft sheets impregnated with phenolic resins. Often, these lower density laminates are bonded directly to materials such as plywood, particle board, and wall board, to form decorative panels suitable only for vertical surface applications. Attempts have been made to provide such panels with the properties of panels suitable for horizontal surfaces, but there have been few, if any, satisfactory horizontal panels produced without employing the more expensive phenolic impregnated kraft sheets as core structures.

SUMMARY OF THE INVENTION

The present invention provides a three sheet overlay which can be used with many low and high density substrates to produce decorative and functional laminates. In the preferred embodiment of the invention, wherein the three sheets are layed up with a flakeboard rigidity-imparting substrate and heat and pressure consolidated therewith, a low pressure laminate is produced which surprisingly meets the standards known in the decorative laminates industry for horizontal surfaces. It is believed that this surprising result is accomplished by virtue of the particular order of arrangement of the three sheets over the substrate.

DETAILED DESCRIPTION OF THE INVENTION

In accordance with the present invention, the three sheet overlay is comprised of a protective overlay sheet, a decorative sheet, and a shock-absorbing sheet. In the preferred embodiments of the invention, each of the three sheets is impregnated or saturated with curable polyester resin.

The top sheet, which is the protective overlay sheet, is clear and transparent after heat and pressure treatment to form a laminate. The sheet is a fiber glass overlay sheet saturated with unsaturated polyester resin. The fiber glass sheet may be in various forms, such as mats, rovings, yarns, woven goods, or paper sheet-like, the latter glass paper being preferred. When pressed under heat, the fiber glass sheet affords the laminate with high wear resistance and contributes to the impact resistance of the final product. The fiber glass sheet contains at least about 55 percent resin by weight and can be highly saturated with resin and in some instances contains by weight up to as much as 85 percent resin and only 15 percent glass fibers. It is preferred that the fiber glass sheet contain by weight about 80 to 85 percent polyester resin.

In the assembly of the laminate, a decorative or print sheet is placed immediately under the fiber glass protective overlay sheet. Conventional print sheet members are used to form the decorative articles of this invention. Such sheets are usually comprised of cellulose fibers, acrylonitrile fibers, polyester fibers, and may even be kraft paper. The decorative sheet is generally printed on at least one surface with a design or dyed or pigmented to impart a solid color thereto. In the preferred embodiment of this invention, the decorative sheet is comprised of alpha-cellulose and is saturated with unsaturated polyester resin. It may contain by weight from 50 percent up to as much as about 65 percent and preferably contains from about 55 percent to 62 percent curable polyester resin.

Immediately under the print sheet is a shock-absorbing sheet saturated with unsaturated polyester resin. This sheet provides a cushioning effect and absorbs shock upon impact, which, combined with the above described two sheets, provides the laminate with a high impact resistance. The cushioning sheet also functions to bridge any voids and defects which may be present on the surface of the substrate to which the three sheet overlay may be fused. This is an important function and affords the laminate with a relatively high gloss.

Various soft, fibrous cushioning sheets can be employed to fulfill the functions of the shock-absorbing sheet just described. The preferred sheet is comprised of cotton fibers and is saturated with polymerizable polyester resin. The cotton sheet may contain by weight in the order of about 50 to 60 percent polyester resin, with the preferred amount of resin in the sheet being in the range of about 55 percent to about 60 percent by weight.

As stated above, each of the three sheets forming the new overlay is impregnated with polyester resin. The resin is preferably a polymerizable unsaturated polyester resin which forms a thermoset upon curing under heat and pressure. Many such resins are known and may be employed in this invention. While it is preferred that all three sheets comprising the overlay of this invention contain the same polyester resin, it is readily apparent that the sheets may contain different types of unsaturated polyester resins.

As is well known, the term polyester resin applies to synthetic resins produced by reacting dibasic acids with dihydric alcohols. Unsaturated polyester resins generally are produced by using a mixture of unsaturated dibasic acids, such as maleic anhydride, fumaric acid, itaconic acid, and citraconic acid, as well as mixtures thereof, and saturated dibasic acids, such as isophthalic acid, adipic acid, azelaic acid, phthalic anhydride, and mixtures thereof. The mixture of saturated and unsaturated dibasic acids is reacted with a dihydric alcohol, such as ethylene glycol, diethylene glycol, propylene glycol, dipropylene glycol, butylene glycol, and mixtures thereof to produce an unsaturated polyester resin. To obtain a greater degree of polymerization, it is customary to blend the resultant unsaturated polyester resin with a reactive monomer, which generally acts as a solvent for the unsaturated polyester and copolymerizes with the unsaturation in the polyester chain to yield a cured, thermoset product. Various unsaturated monomers can be used to cross-link the polyester resin, including vinyl compounds such as styrene, alpha-methyl styrene, vinyltoluene, vinyl acetate, diallyl phthalate, diacetone acrylamide, methyl acrylate, methyl methacrylate, chlorostyrene, divinyl benzene, triallyl cyanurate, and mixtures thereof. For purposes of this specification, the various polyester resins resulting from the above types of acids and alcohols, which may include one or more cross-linking monomers, will be referred to as "polymerizable unsaturated polyester resins". The particular polyester resin employed is not of great importance, and if one type is preferred, it is those resins prepared in known manner from a mixture of isophthalic and fumaric acids at a mole ratio of 1:1 reacted with polypropylene glycol, with the cross-linking monomer for the resulting unsaturated polyester resin being diallyl phthalate. The complete resin will have an average molecular weight between 3,000 and 3,500. Additionally, small amounts, i.e., 5 to 10 percent by weight of hexamethyl methoxy melamine may be used to aid copolymerization. Of course, as is known, the blend of unsaturated polyester resin and cross-linking monomer will preferably include suitable catalysts, such as peroxy compounds, and accelerators, as well as flow control agents.

The polymerizable unsaturated polyester resin can be applied to the sheets forming the overlay of this invention by any suitable application, such as dipping, coating and other means of metering a solvent solution of the resin. Suitable solvents for the resin may be used for coating applications, such as the various ketones and esters including acetone, methyl ethyl ketone, ethyl acetate, and butyl acetate, as well as aromatic solvents such as benzene, toluene, and xylene. The viscosity and resin solids content of the solvent system are adjusted for complete saturation and resin pick-up. The sheets can be surface coated with the unsaturated polyester resin or substantially completely impregnated or saturated with the resin. Regardless of the method of application, it is preferred, but not necessary, that more resin be located on the face of the print sheet (the side contacting the fiber glass overlay in the laminate) than on the back side thereof (the side contacting the cotton sheet in the laminate). The sheets are dried at temperatures high enough to remove substantially all of the volatiles but not so high that the unsaturated polyester resin will be prematurely cured in the presence of the cross-linking agent.

The three sheets forming the composite overlay of this invention may be combined under heat and pressure to form a unitary overlay panel. This panel generally ranges in thickness between about 0.020 to about 0.030 inch, and it is preferred that it not exceed about 0.030 inch in thickness. The panel, after its consolidation, can be bonded or glued by any suitable means to any suitable substrate, such as plywood, gypsum board, lumber, particle board, hardboard, metal, flakeboard, and cement-asbestos board.

In the preferred method of making the laminated articles of this invention, the three sheets will be layed up with a substrate and bonded to a broad side of the substrate and to each other in one heat and pressure operation. In this way, a heat and pressure consolidated laminate will be prepared which comprises (1) a rigidity-imparting base member, (2) a cotton sheet bonded to the base member, (3) a print sheet fused to the cotton sheet, and (4) a fiber glass overlay sheet fused to the print sheet, each of the sheets (2)-(4) containing a substantially cured, thermoset polyester resin which in its uncured state is a polymerizable unsaturated polyester resin as defined hereinabove. The lamination can be accomplished by use of a standard heated platen press with one or more openings. Conventional cauls, such as aluminum caul plates, can be used. Any of many surface finishes on the top surface of the laminate can be obtained by use of known releases papers of various finishes inserted between a caul plate and the fiber glass overlay sheet. With the unsaturated polyester resins described above, low pressures and temperatures and relatively short pressing times can be used to cure the resin and form the laminate. For example, with a pressure as low as from about 180 to about 200 p.s.i. and a temperature of about 270°–275° F., satisfactory laminates can be made with press times of only about 4 ½ TO 5 minutes. It has been found that under these conditions, the resin flows sufficiently to give the needed surface properties as well as adhesion of the overlay sheets to the substrate.

It will be apparent to those skilled in the art that a suitable backing sheet can also be layed up with the substrate and the overlay sheets, and bonded to the back side of the substrate. For instance, a backing sheet comprising alpha-cellulose fibers, saturated with polymerizable unsaturated polyester resin, can be bonded to one broad side of the substrate at the same time that the overlay sheets are bonded to the other broad side of the substrate, When a backing sheet is used, a sheet of release paper is usually placed in the layup between the backing sheet and the caul plate.

In the preferred embodiment of the invention, the three overlay sheets are layed up with a substrate of flakeboard, to produce a lower pressure laminate. Flakeboard is known to be a product prepared by compressing resin-coated wood flakes under heat into a unitary structure. The flakeboard preferably has a density of at least about 46 pounds per cubic foot. It is preferred that the thickness variation of the flakeboard not exceed about plus or minus 0.010 inch in order to have a uniform pressure distribution during the laminating step. It has been found that when the three overlay sheets are combined with a flakeboard substrate having a density of at least about 46 pounds per cubic foot, the resulting laminate satisfies the requirements of a general purpose laminate and is, surprisingly, suitable for use as a horizontal structure as well as a vertical structure. The three overlay sheets must be placed in the order as described, i.e., the cotton sheet next to the flakeboard, with the print sheet between the cotton and fiber glass sheets, in order to meet the NEMA standards for horizontal surfaces. It has been found, for example, that if the fiber glass sheet is arranged in the assembly between the print sheet and the cotton sheet, the decorative flakeboard laminate has a surface with insufficient wear resistance which will fracture when subjected to the 36-inch NEMA impact resistance test (NEMA Standard LD 1–2.15) called for in the specifications for general-purpose-type decorative laminates. If the fiber glass sheet is arranged between the cotton sheet and the flakeboard substrate, wear resistance is reduced. Only when the sheets are assembled, from the bottom up, with the cotton sheet adjacent the flakeboard substrate, followed by the print sheet, and then the top sheet of fiber glass, are the standards for horizontal surfaces met. This surprising result is significant since it provides the basis for producing a low pressure laminate with properties required for horizontal structures.

The invention will be described in greater detail with the aid of the following examples. As those skilled in the art will appreciate, the examples are set forth primarily for purposes of illustrating the invention, and are not to be considered as limitations thereon.

EXAMPLE 1

A general-purpose-type decorative laminate was prepared in accordance with the present invention by laminating three overlay sheets to a flakeboard core.

The top overlay sheet was a 26 pounds basis weight unpigmented sheet, containing by weight about 17 percent glass fibers and about 83 percent polymerizable unsaturated polyester resin, and having a thickness of about 8 mils. The print sheet was a 7-mils thick alpha-cellulose paper sheet containing by weight about 55 percent polymerizable unsaturated polyester resin. The print sheet containing by weight about 55 percent polymerizable unsaturated polyester resin. The print sheet had been printed on one side with ink to form a wood grain pattern. It has a basis weight of about 65 pounds. The shock-absorbing sheet was an unpigmented 18-mils thick nonwoven sheet of cotton linters and contained by weight about 55 percent polymerizable unsaturated polyester resin.

The polymerizable unsaturated polyester resin in each instance comprised as the dibasic acid component a mixture of isophthalic acid and fumaric acid in a 1—1 mole ratio. The dibasic acid mixture was reacted with propylene glycol in a mole ratio of 1–1.05. The average molecular weight of the isophthalic acid-fumaric acid polyethylene glycol, polyester resin was 3,200. In addition, the polyester resin contained about 20 percent by weight diallyl phthalate as a cross-linking monomer, about one-fourth percent by weight tert-butyl perbenzoate as a catalyst, and about 5 percent by weight hexamethyl methoxy melamine as another copolymerizer. For spread the polyester resin onto each of the three sheets a conventional solvent system was used and the viscosity was adjusted to 15–30 seconds No. 4 Ford cup at a 45–60 percent resin solids content in solution. Each of the above-described three sheets was saturated with the polyester resin by conventional dipping procedures and dried.

The flakeboard core for the laminate was about three-quarters inch thick and had a density of about 48 pounds per cubic foot. The flakeboard had been prepared from aspen flakes and contained about 5 percent urea-formaldehyde resin and about 1 percent wax emulsion. It has been manufactured by compressing the resin-coated flakes for about 8 minutes in a platen press loaded to about 500 p.s.i. and heated to a temperature of about 315° F.

The layup for producing the decorative laminate comprised an aluminum caul plate followed by a sheet of release paper, the fiber glass sheet, the print sheet with its printed side next to the fiber glass sheet, the cotton sheet, and the flakeboard core, and finally another aluminum caul plate. The layup was placed in a laminating press and the laminate was formed and the resin cured by heating for about 5 minutes at 270° F. under a pressure of about 185 p.s.i. Upon cooling, the resultant laminate was suitable for use in both horizontal and vertical applications. The three sheet overlay measured only about 0.027 inch in thickness. The laminate of the flakeboard and overlay sheets met all of the NEMA Standards for general-purpose-type decorative laminates, including and especially those standards for wear resistance and 36-inch impact resistance. The following table summarizes the data for a laminate produced in accordance with this example:

sheet was layed up with the other laminate components and bonded to the broad side of the flakeboard core opposite to the broad side to which the overlay sheets were bonded. In this instance, the backing sheet was a 65 pounds basis weight alpha-cellulose sheet which had been saturated with about 60 percent by weight of the polymerizable unsaturated polyester resin.

After consolidation under the conditions described in Example 1, the resultant laminate was suitable for vertical surface application and met all NEMA Standards for horizontal application except the 36-inch impact resistance test.

EXAMPLES 3–7

As stated previously, decorative laminates can be made using various core materials as substrates for the three sheet overlay of this invention. Laminates were made as described above in Example 1, except that the following cores were used in place of flakeboard: ¾-inch fir plywood, Example 3; ⅜-inch untempered hardboard, Example 4; ¼-inch lauan plywood, Example 5; ⅜-inch tempered hardboard, Example 6; and ¾-inch poplar lumber, Example 7. In each instance, the resultant laminate was suitable for use in vertical surface applications.

EXAMPLES 8–10

Unitary decorative overlay panels, comprising the three sheets of this invention, can be made and subsequently glued or bonded to various substrates to form laminates.

The panels were prepared by using the resin saturated glass fiber, alpha-cellulose, and cotton sheets described in Example 1. The layup for producing each panel comprised a caul plate followed by a sheet of release paper, the fiber glass sheet, the print sheet, the cotton sheet, a sheet of release paper, and another caul plate. The layup was placed in a laminating press and each panel was formed and the polyester resin cured by heating for about 5 minutes at about 270° F. under a pressure of about 185 p.s.i. The resultant unitary decorative overlay panels each measured from about 0.025 to about 0.030 inch in

TABLE 1

| Test | Results | NEMA specifications |
| --- | --- | --- |
| Wear resistance, g./100 cycles | 0.051 avg.<br>0.059 max.<br>0.046 min. | 0.080 max. |
| Resistance of surface to boiling water | Satisfactory | No blistering or other discernible surface disturbance. |
| Resistance of surface to high temperature | do | Do. |
| Resistance of surface to cigarette burns, seconds | 142 avg. | 110 min. |
| Resistance of surface to stains | Satisfactory | Unaffected by reagents 1 through 20. Unaffected by reagent 21 through 29 except for superficial stains. |
| Color fastness | do | Not more than slight color change and no crazing. |
| Immersion in boiling water | do | No crazing, chalking or delamination. |
| Weight change, percent | 8.9 | 2.0 min. and 10.0 max. |
| Thickness change, percent | 8.1 | 10.0 max. |
| Dimensional change: | | |
| Gross dimensional change, percent: | | |
| Machine direction | 0.22 | 0.5 max. |
| Cross-machine direction | 0.73 | 0.9 max. |
| Flexural properties: | | |
| Flexural strength, p.s.i.: | | |
| 1. Lengthwise direction: | | |
| a. Face in tension | 17,300 | 12,000 min. |
| b. Face in compression | 23,600 | 18,000 min. |
| 2. Crosswise direction: | | |
| a. Face in tension | 16,800 | 12,000 min. |
| b. Face in compression | 18,100 | 18,000 min. |
| Modulus of elasticity, p.s.i.: | | |
| 1. Lengthwise direction: | | |
| a. Face in tension | 1,240,000 | 800,000 min. |
| b. Face in compression | 1,240,000 | 800,000 min. |
| 2. Crosswise direction: | | |
| a. Face in tension | 1,120,000 | 800,000 min. |
| b. Face in compression | 930,000 | 800,000 min. |
| Deflection at rupture, inch: | | |
| 1. Lengthwise direction: | | |
| a. Face in tension | 0.040 | 0.02 min. |
| b. Face in compression | 0.064 | 0.03 min. |
| 2. Crosswise direction: | | |
| a. Face in tension | 0.040 | 0.02 min. |
| b. Face in compression | 0.073 | 0.03 min. |
| Appearance | Satisfactory | No listed defects. |
| Resistance to impact height of drop, inch | 44 | 36. |
| Finish | Satisfactory | As specified. |

EXAMPLE 2

Example 1 was repeated except that the flakeboard core for the laminate had a density of about 42 pounds per cubic foot and had a thickness of about one-half inch. Also, a backing thickness, with an average thickness of about 0.027 inch.

The unitary panels were subsequently glued to various substrates to produce commercial decorative laminates. The substrates, were as follows: ¾-inch fir plywood, Example 8; ⅝-inch particle board, Example 9; and ⅜-inch hardboard, Example 10. The unitary decorative panels were bonded to the substrates by use of a conventional catalyzed urea-formaldehyde glue. In each case, the substrate and decorative panel were combined in a platen press heated to about 250° F. for about 4 minutes under a pressure of about 160 p.s.i. The resultant laminates had different properties depending upon the substrate used. All were suitable for vertical surface application.

From the above examples, it can be seen that a low pressure laminate with surprisingly high impact resistance can be produced for use in horizontal surface applications, by use of a particular combination of overlay sheets heretofore unknown in the art. While flakeboard has been disclosed as the preferred core material, other suitable materials can be used to make low pressure laminates having great utility in vertical surface applications. Furthermore, relatively thin (not exceeding 0.030 inch in thickness) unitary panels can be produced from the overlay sheets and subsequently glued to various substrates to make decorative and functional laminates. Such panels also find great utility in post-forming operations because of the flexibility of polyester resins.

As stated, the laminates of this invention are not dependent upon the use of a particular polymerizable unsaturated polyester resin. Those skilled in the art will appreciate that any such polyester resin may be used to saturate the sheets forming the overlay of the present invention, as long as the resin is curable at the temperatures and pressures and for the times set forth herein for the manufacture of low pressure laminates. One suitable, commercially available polyester resin is Reichhold Chemical Company's Polylite 93–516. An isophthalic-type of unsaturated polyester resin is preferred but the present invention is not limited thereto.

As one skilled in the art will appreciate, various changes may be made in the examples and descriptions set forth above without departing from the spirit of the invention or the scope of the appended claims.

I claim:

1. A unitary, heat and pressure consolidated decorative laminate which comprises a rigidity-imparting base member, a soft, cushioning, shock-absorbing non-woven fibrous cotton sheet bonded to said base member, a decorative sheet bonded to said cushioning sheet, and a transparent fiber glass overlay sheet bonded to the decorative sheet, each of said sheets containing a substantially cured, thermoset polyester resin which in its uncured state is a polymerizable unsaturated polyester resin, said cured resin bonding said sheets to each other and to said base member.

2. The laminated article of claim 1 wherein the fiber glass sheet contains by weight about 55 percent to about 85 percent polyester resin.

3. The laminated article of claim 1 wherein the decorative sheet is an alpha-cellulose sheet containing by weight about 50 percent to about 65 percent polyester resin.

4. The laminated article of claim 1 wherein the cushioning sheet is comprised of cotton fibers and contains by weight about 50 percent to about 60 percent polyester resin.

5. The laminated article of claim 1 wherein the rigidity-imparting base member is flakeboard.

6. A low pressure decorative laminate suitable for use in horizontal surface applications comprising the heat and pressure consolidated unitary structure having the following laminae in the order of ascending superimposed relationship:

a. a flakeboard base member having a density of at least about 46 pounds per cubic foot, b. an unpigmented non-woven cotton fiber sheet impregnated with a thermosetting polyester resin, c. a decorative sheet impregnated with a thermosetting polyester resin, and d. an unpigmented fiber glass sheet impregnated with a thermosetting polyester resin, wherein the thermosetting resin in each sheet is converted to the thermoset state during consolidation to the unitary structure, to fuse the sheets to each other and to the flakeboard.

7. The low pressure laminate of claim 6 in which the flakeboard carries on its top broad side the sheets (b), (c), and (d) in superimposed relationship, and carries on its bottom broad side bonded thereto a backing sheet impregnated with a thermoset polyester resin which in its uncured state is a polymerizable unsaturated polyester resin.

8. A decorative laminated article having high impact resistance, suitable for use in horizontal surface applications, which comprises:

a. a flakeboard base member having a density of at least about 46 pounds per cubic foot, and b. a decorative three-sheet overlay bonded to one broad surface of the flakeboard base member, said decorative overlay comprising 1. a transparent fiber glass sheet containing by weight about 80 to 85 percent polyester resin, 2. an alpha-cellulose print sheet containing by weight about 55 to 62 percent polyester resin and having a printed design on one side thereof, and 3. an unpigmented non-woven cotton fiber sheet containing by weight about 55 to 60 percent polyester resin, said polyester resin, which in its uncured state is a polymerizable unsaturated polyester resin, in said overlay sheets being substantially cured and bonding said overlay sheets to each other and to the flakeboard base member, said cotton fiber sheet positioned in the laminate adjacent the flakeboard base member and bonded thereto, said print sheet positioned in the laminate between said cotton fiber sheet and said fiber glass sheet, said print sheet being bonded on its printed side to the fiber glass sheet and being bonded on its other side to the cotton fiber sheet.

9. The decorative laminated article of claim 8 wherein the three-sheet overlay has a thickness not exceeding about 0.030 inch.

10. A unitary, laminated product having a thickness not exceeding about 0.030 inch, suitable for use as a decorative overlay for substrates, which comprises a decorative sheet having a printed design on one side thereof, a transparent glass fiber sheet fused on one side thereof to the printed side of the decorative sheet, and a non-woven cotton fiber sheet fused on one side thereof to the other side of the decorative sheet, said sheets being saturated with and unitarily fused to each other by a substantially cured polyester resin which in its uncured state is a polymerizable unsaturated polyester resin.

11. The laminated product of claim 10 in which the decorative sheet is an alpha-cellulose sheet containing by weight about 50 to 65 percent polyester resin.

12. The laminated product of claim 11 in which the glass fiber sheet contains by weight about 55 to 85 percent polyester resin.

13. The laminated product of claim 12 in which the cotton fiber sheet contains by weight about 50 to 60 percent polyester resin.

* * * * *